US008505367B2

(12) United States Patent
Porten et al.

(10) Patent No.: US 8,505,367 B2
(45) Date of Patent: Aug. 13, 2013

(54) DEVICE AND METHOD FOR CYLINDER-TORQUE EQUALIZATION OF AN INTERNAL COMBUSTION ENGINE, COMPUTER PROGRAM, COMPUTER PROGRAM PRODUCT

(75) Inventors: Guido Porten, Vaihingen/Enz (DE); Lu Chen, Bietigheim-Bissingen (DE); Marc Schott, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 13/141,627

(22) PCT Filed: Dec. 17, 2009

(86) PCT No.: PCT/EP2009/067377
§ 371 (c)(1),
(2), (4) Date: Sep. 1, 2011

(87) PCT Pub. No.: WO2010/079073
PCT Pub. Date: Jul. 15, 2010

(65) Prior Publication Data
US 2011/0302999 A1 Dec. 15, 2011

(30) Foreign Application Priority Data
Jan. 9, 2009 (DE) .......................... 10 2009 000 134

(51) Int. Cl.
*G01M 15/00* (2006.01)
(52) U.S. Cl.
USPC ...................................................... 73/114.31
(58) Field of Classification Search
USPC ...................................................... 73/114.31
See application file for complete search history.

(56) References Cited

U.S. PATENT DOCUMENTS 6,021,758 A * 2/2000 Carey et al. .................... 123/436
6,892,691 B1 * 5/2005 Uhl et al. .................... 123/198 A
(Continued)

FOREIGN PATENT DOCUMENTS

| DE | 198 28 279 | 12/1999 |
|---|---|---|
| DE | 199 45 813 | 3/2001 |
| DE | 102 61 618 | 7/2004 |
| WO | WO 01/63111 | 8/2001 |

OTHER PUBLICATIONS

International Search Report and Written Opinion of the International Searching Authority for PCT/EP2009/067377, dated Mar. 25, 2010.

*Primary Examiner* — Freddie Kirkland, III
(74) *Attorney, Agent, or Firm* — Kenyon & Kenyon LLP

(57) ABSTRACT

A device, a method, a computer program and a computer program product for diagnosing an internal combustion engine (100), in which a first cylinder (102) includes a combustion chamber (101), a fuel quantity and a fresh air quantity being supplied to the combustion chamber (101) for combustion; a torque contribution (D), generated by the combustion, of the first cylinder (102) in a first operating mode (B1) of the internal combustion engine (100) being a function of the fresh air quantity supplied, and in a second operating mode (B2) of the internal combustion engine (100) being essentially a function of the fuel quantity, wherein a first variable (L1) characterizing a smooth running of the internal combustion engine (100) in the first operating mode (B1) is ascertained, a second variable (L2) characterizing the smooth running of the internal combustion engine (100) in the second operating mode is ascertained, the first variable (L1) is compared to the second variable (L2), a diagnosis of the internal combustion engine (100) is made as a function of the result of the comparison.

18 Claims, 3 Drawing Sheets

(56) References Cited

U.S. PATENT DOCUMENTS

| | | | |
|---|---|---|---|
| 6,941,930 B2 * | 9/2005 | Uhl | 123/406.23 |
| 7,152,594 B2 * | 12/2006 | Anilovich et al. | 123/690 |
| 7,260,470 B2 * | 8/2007 | Damitz et al. | 701/114 |
| 8,127,745 B2 * | 3/2012 | Surnilla et al. | 123/406.29 |
| 8,249,794 B2 * | 8/2012 | Miyamoto et al. | 701/103 |
| 2003/0159677 A1 * | 8/2003 | Uhl | 123/436 |

* cited by examiner

DEVICE AND METHOD FOR CYLINDER-TORQUE EQUALIZATION OF AN INTERNAL COMBUSTION ENGINE, COMPUTER PROGRAM, COMPUTER PROGRAM PRODUCT

BACKGROUND OF THE INVENTION

1. Field of the Invention

The present invention is based on a device and a method for cylinder-torque equalization of an internal combustion engine.

2. Description of Related Art

A method for cylinder-torque equalization of an internal combustion engine is already known from published German patent application document DE 198 28 279 A1. In order to make possible an operation low in exhaust gas using three-way catalytic converters, the internal combustion engine is operated at an average lambda value of 1. The average lambda value 1 is set by a lambda regulation. In this context, the distinction is made between the operating modes homogeneous operation and stratified operation. In stratified operation, the lambda value and the torque contribution of a single cylinder are essentially a function of the fuel quantity supplied. In homogeneous operation, the fuel quantity required to achieve the average lambda value 1 is first introduced by the lambda regulation into each cylinder of the internal combustion engine, as a function of the air quantity supplied to the cylinder. At the same time, in stratified operation, the torque contribution of a single cylinder is monitored by a cylinder-torque equalization function, using the irregular running signal. If the torque contribution of the individual cylinders deviate too greatly from one another, the torque contributions of the individual cylinders are set to be equal by regulating the fuel quantity. As a result of the cylinder-torque equalization function in stratified operation, adjustment values are available for the fuel quantity to be injected and the control signals of the fuel injectors, which may also be used in homogeneous operation or homogeneous lean operation of the internal combustion engine for cylinder-torque equalization.

At small differences between the individual cylinder torque contributions, exhaust gas created by the homogeneous combustion is not impaired or only little impaired, since a three-way catalytic converter, situated in the exhaust branch is still able to convert the exhaust gas. If the difference between cylinder-individual torque contributions becomes too great, not only is the fuel usage increased, but in addition, the exhaust gas emissions of the internal combustion engine may lie outside the legally specified limits.

BRIEF SUMMARY OF THE INVENTION

The device and method according to the present invention have the advantage, in this context, that a fuel quantity and a fresh air quantity are supplied to a combustion chamber of an internal combustion engine for combustion, a torque contribution of a cylinder generated by the combustion, in a first operating mode of the internal combustion engine, being essentially a function of the fresh air quantity supplied, and in a second operating mode of the internal combustion engine being essentially a function of the fuel quantity supplied, a first variable being ascertained that characterizes the smooth running of the internal combustion engine in the first operating mode, a second variable being ascertained that characterizes the smooth running of the internal combustion engine in the second operating mode, the first variable is compared to the second variable, and a diagnosis of the internal combustion engine is carried out as a function of the result of the comparison. This means that it is determined, by the evaluation of the smooth running of the internal combustion engine, whether the fresh air quantity supplied to the respective cylinder during the operation of the internal combustion engine in homogeneous operation or in homogeneous lean operation is too great, that is, an air error is present individual to each cylinder. This method is based on the idea that the smooth running signal characterizes the torque contribution of the individual cylinders.

It is particularly advantageous if a fresh air quantity that is supplied erroneously is detected when the difference between the first variable and the second variable is greater than a specified value. This means that the difference between the smooth running of the internal combustion engine at homogeneous combustion and the smooth running in the internal combustion engine at lean combustion has to be small enough in order to be able reliably to exclude an erroneously supplied fresh air quantity in a cylinder.

It is particularly advantageous if the first variable and the second variable are ascertained at least partially during a power stroke of the cylinder. This means that the smooth running of the internal combustion engine is observed exactly in the stroke in which the torque contribution of the cylinder is accomplished. Because of this, the first variable and the second variable are able to be assigned unequivocally to the cylinder that supplies the torque contribution during the segment observed.

It is particularly advantageous if, in the first operating mode, a first fuel quantity is injected, and in the second operating mode a second fuel quantity and a third fuel quantity are injected. This makes possible distinguishing between the charging error and a fuel error.

It is particularly advantageous if the second fuel quantity in the second operating mode is determined in such a way that a lean mixture is created. Because of that, the torque contribution in the second operating mode depends more on the fuel quantity injected than on the air mass. A distinction between charging errors and fuel errors is thus made possible particularly simply.

It is particularly advantageous if the third fuel quantity is determined in such a way that the lambda value of the exhaust gas is essentially one. Because of that, the method according to the present invention is executed without a negative effect on the emission and the service life of the catalytic converter.

It is particularly advantageous if a correction of the fuel quantity supplied takes place when the difference between the first variable and the second variable is less than or equal to a specified threshold value. This means that the correction of the fuel quantity supplied takes place only when no unintended erroneously supplied fresh air quantity has been ascertained. This avoids an erroneous correction.

It is especially advantageous if the correction of the fuel quantity supplied takes place in the second operating mode. The correction is accordingly terminated in a simple manner at fuel-led lean combustion.

BRIEF DESCRIPTION OF THE INVENTION

Exemplary embodiments of the present invention are shown in the drawings and explained in greater detail in the following description. The figures show:

DETAILED DESCRIPTION OF THE INVENTION

Figure 1:
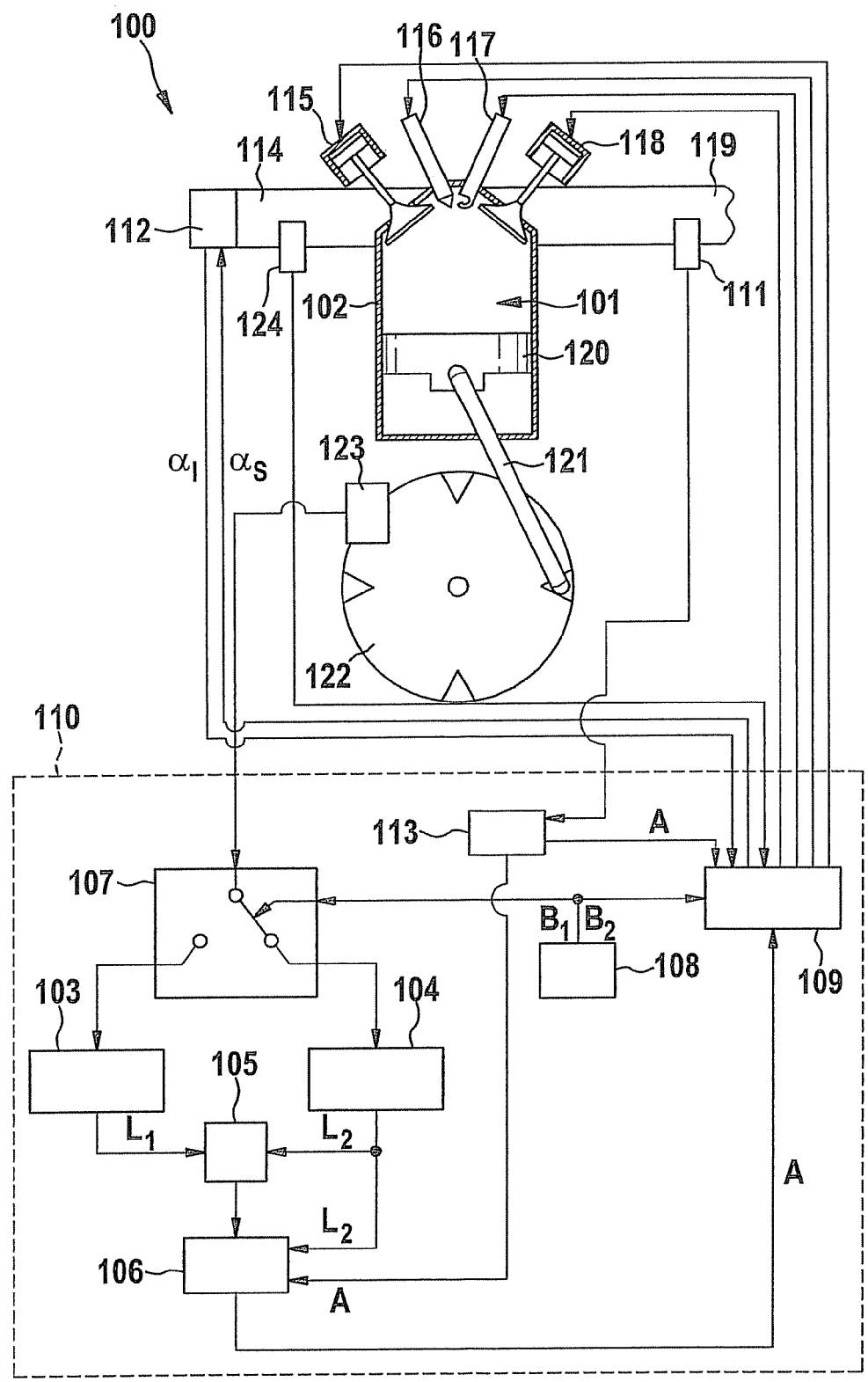
FIG. 1 shows a schematic representation of an internal combustion engine.

In FIG. 1, an internal combustion engine is shown schematically, for instance, an Otto engine or a Diesel engine, and denoted by 100. Internal combustion engine 100 includes a plurality of cylinders, of which, however, only a first cylinder 102 is illustrated, for clarity's sake, in FIG. 1. First cylinder 102 of internal combustion engine 100 includes a combustion chamber 101, to which fresh air is supplied via a throttle valve 112 and an intake manifold 114 situated between throttle valve 112 and intake valve 115. In the intake manifold, there is an air mass sensor 124, which records an air mass F. In addition, fuel is supplied to combustion chamber 101 by a fuel injector 116. Fuel injector 116 is situated at combustion chamber 101 in such a way, for example, that the fuel is directly injected into combustion chamber 101. A fuel/air mixture created thereby is combusted in combustion chamber 101. In the case of an Otto engine, internal combustion engine 100 includes a spark plug 117 for this, which is also situated on combustion chamber 101.

Exhaust gas created by the combustion is passed through a discharge valve 118 situated on combustion chamber 101, through an exhaust pipe 119 and passed by a lambda sensor 111.

Thermal energy created by the combustion of the fuel/air mixture in combustion chamber 101 is transmitted at least partially by a piston 120 via a connecting rod 121 to a crankshaft 122. Crankshaft 122 is thereby set into a rotary motion. The rotary motion of crankshaft 122 is recorded by a sensor 123.

In a first operating mode B1 of internal combustion engine 100, throttle valve 112 and fuel injector 116 are controlled in a known way so that a torque desired by the driver is generated. For this purpose, first injection quantity K1 is determined using a characteristics map as a function of air mass F ascertained by air mass sensor 124. The first injection takes place in a known manner at a point in time that is favorable for the combustion and torque generation. A first setpoint fuel quantity is dimensioned matching to ascertained air mass F in such a way that not only is the torque desired by the driver generated, but the combustion also takes place at a setpoint lambda value 1. In first operating mode B1, an air-guided combustion method is involved, or a homogeneous operation.

On the one hand, a first fresh air quantity F1 that has actually been introduced into first cylinder 102, is able to deviate from the measured total air mass F, divided by the number of cylinders, because of soiling or unequal distribution in intake manifold 114, for example. On the other hand, the first fuel quantity K1, that has been introduced by fuel injector 116, may deviate from a first setpoint fuel quantity based on tolerances of fuel injector 116. These deviations result in a cylinder-individual first lambda value deviating from the setpoint lambda value of 1. Therefore, the lambda regulation corrects the first setpoint fuel quantity, in a known manner, globally with respect to the exhaust gas, and sets an average lambda value 1 in first operating mode B1.

Since the torque contribution of each cylinder in the air-guided first operating mode B1 is a function of the fresh air quantity, differences in charging that are individual to each cylinder lead to different torque contributions, and with that, to irregular running of internal combustion engine 100.

This increased irregular running caused by charging differences is reduced in second operating mode B2 by the injection of a second fuel quantity (main injection) which leads to a lean torque-determining basic combustion and a third fuel quantity (secondary injection) which leads to a stoichiometric exhaust gas lambda equal to 1 in place of the first fuel quantity. The second fuel quantity is dimensioned for each cylinder, in a known way, so that the torque contributions of all cylinders are extensively the same and the torque requirement of the driver is implemented. The main injection takes place in a known manner at a point in time that is favorable for the combustion and torque generation. The third fuel quantity is dimensioned in a known manner, so that overall a lambda value of 1 sets in on an individual cylinder basis. The injection of the third fuel quantity takes place in a known manner at a point in time at which the combustion of the third fuel quantity no longer supplies any substantial torque contribution.

This means that the lambda value individual to each cylinder may rise, for example, to 1.15, in response to too great a fresh air quantity or too low a second fuel quantity in a lean cylinder. The third fuel quantity is dimensioned, for example, in such a way that the lambda value of the exhaust gas is reduced by 0.15. With that, a lambda value equal to 1 comes about on an individual cylinder basis in the exhaust gas after combustion of the second and the third fuel quantity. This removes the irregular running of internal combustion engine 100, and at the same time the lambda value of 1 is maintained on an individual cylinder basis.

For the distinction between a different fresh air quantity in the cylinders (charging difference) and too small a fuel quantity (fuel error) as the cause of the error, the torque contribution or the irregular running in first operating mode B1 and the torque contribution or the irregular running in second operating mode B2 are compared to each other.

The method according to the present invention is based, in this instance, on the realization that the difference in the torque contribution of the individual cylinders in the air-guided homogeneous operation is clearly greater in the case of a charging error than in the fuel-guided lean operation.

If, for instance, too great a fresh air quantity reaches a cylinder (lean cylinder), its torque contribution differs in the air-guided first operating mode B1 by ca. 15%, for example, from the other cylinders (rich cylinders). By contrast, the torque contribution of the lean cylinder differs in second operating mode B2 by only ca. 5% from the rich cylinders. Thus, the torque difference in this example amounts to ca. 10%. This is illustrated in FIG. 3, for example.

Figure 3:
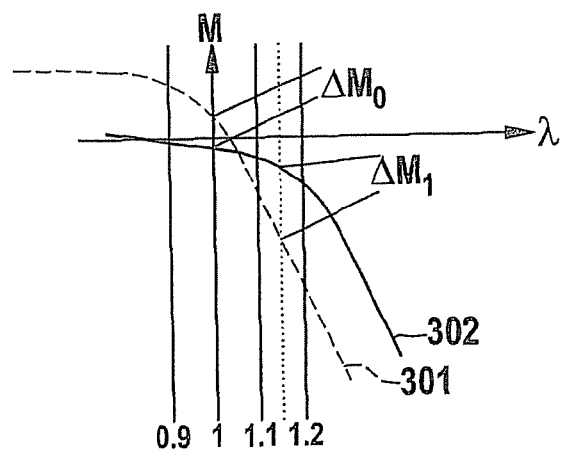
FIG. 3 shows a first diagram for a first and a second characteristics line.

FIG. 3 shows a torque contribution of the lean cylinder for different average values of the overall lambda's of all cylinders, and designated as 301. A curve of the torque contributions of a plurality of rich cylinders is shown in FIG. 3 and designated as 302. The assumption is made here that the injection quantity is the same for all cylinders, and that more fresh air is supplied to the lean cylinder than to the rich cylinders.

The curves of the torque contributions of the lean cylinder and the rich cylinder begin at a lambda value of less than 0.9 at a positive starting value that is different from zero. The starting value of the torque contribution of the lean cylinder, in this context, is greater than the starting value of the torque contribution of the rich cylinders. Subsequently, the torque contribution of lean cylinder 301 and of rich cylinders 302 decreases linearly at first and then at an increasing slope. The curve of the torque contribution of lean cylinder 301, in this instance, is approximately linear again as of a lambda value of 1. The curve of the torque contribution of rich cylinder 302, in this instance, is approximately linear again as of a lambda value of 1.2.

The difference between the torque contributions of the lean cylinder and the torque contributions individual to each cylinder of the rich cylinders is designated in FIG. 3, for the value lambda=1 as $\Delta M0$ and for lambda=1.15 as $\Delta M1$.

The different torque contributions of the individual cylinders lead to a different acceleration of crankshaft 122, in this context, which is noticeable by different segment times during which the torque contributions of the individual cylinders are accomplished. The torque contribution of first cylinder 102, for example, takes place in an angular range between 180° and 360° of crankshaft angle. The segment time in which the torque contribution of first cylinder 102 takes place is, for instance, the time period which the crankshaft requires to run through the angular range of 180° to 360° of crankshaft angle. From the comparison of the segment times of the individual cylinders to one another, a variable is ascertained, in a known manner, which characterizes the irregular running of the internal combustion engine. The segment time individual to each cylinder is compared to the average value of all the segment times, for example. The deviation of the segment time individual to each cylinder from the average corresponds to the running smoothness.

On the assumption that the same quantity of fuel is injected into all the cylinders, the lean cylinder in first operating mode B1 generates a slightly higher torque contribution than the rich cylinders, as may be seen in FIG. 3. Now, if one switches over from first operating mode B1 to second operating mode B2, for example, in the error-free case with respect to the combustion of the fuel quantity, which accomplishes a torque contribution, this corresponds to an offset of lambda equal to 1 (first fuel quantity in first operating mode B1) to a lean lambda, for instance, equal to 1.15 (second fuel quantity in second operating mode B2). In the case of a cylinder charge difference, the lambda value of the lean cylinder of 1.2, for example, is shifted to 1.35, whereas the rich cylinders having, for instance, 0.93 are shifted to 1.08. As may be seen in FIG. 3, the torque contribution of the lean cylinder changes by 15%, for example, in this context, while the torque contribution of the rich cylinders changes by only 5%.

Figure 4:
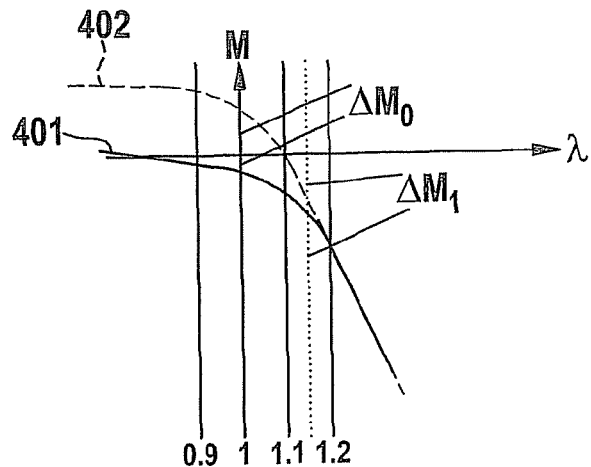
FIG. 4 shows a second diagram for a third and a fourth characteristics line.

In FIG. 4, a corrected curve of the torque contribution of the lean cylinder is designated by 401. The corrected curve of the torque contribution of the rich cylinders is designated in FIG. 4 by 402. The corrected curve of lean cylinder 401 corresponds to the curve, shifted to the right, of the torque contribution of lean cylinder 301 in FIG. 3. The corrected curve of rich cylinder 401 corresponds to the curve, shifted to the left, of the torque contribution of rich cylinder 302 in FIG. 3.

The shifting is determined by the adjustment parameters in such a way that the corrected curve of the torque contributions of lean cylinder 401 and the corrected curve of the torque contributions of rich cylinder 402 for lambda values greater than 1.15 overlap to the greatest extent. Because of that, the difference between the torque contributions of the lean cylinder and the rich cylinders, for instance, for an overall lambda of 1.15 becomes 0.

By the ascertainment of adjustment parameters in second operating mode B2, the second fuel quantity and the third fuel quantity are determined in a known manner, in such a way that the smooth running of the internal combustion engine is sufficiently smooth at an average lambda of 1. The throttle valve setting and the first fuel quantity, are first determined, in this context, in such a way that in all cylinders a lean combustion takes place, having a lambda value at which the torque contribution is the same for all cylinders. As is shown in FIG. 4, this means that the combustion in the lean cylinder, for instance, takes place at a lambda of 1.125 and in the rich cylinders, for instance, at a lambda Of 0.955. The torque contribution of the lean and the rich cylinders, in this instance, as shown in FIG. 4, is the same, only for a certain range of lambda greater than a first range boundary. For instance, the torque contribution for lambda greater than 1.15 is equal for the lean cylinder and the rich cylinders. For lambda values outside this range, for instance, less than or equal to 1.15, the corrected curves diverge.

Thus, because of the adjustment of the second and third fuel quantity for the determined range of lambda greater than the first range boundary, for example, greater than 1.15, the torque differences are extensively well balanced. The average lambda value of 1 is largely regulated.

In case any lambda values for the combustion outside the named range were to be used, such as lambda being less than or equal to 1.15, the smooth running gets clearly worse by increasing torque differences between the lean cylinder and the rich cylinders. This is also attributable to the shifting of the curves of the torque contributions of lean cylinder 301 and rich cylinders 302.

In FIG. 4, the original difference between the torque contributions of the lean cylinder and the rich cylinders, $\Delta M0$ and $\Delta M1$, from FIG. 3, are entered.

For the case in which one cylinder has too little fresh air supplied to it, the same problem applies with respect to the difference in the torque contributions of the cylinder to which too little fresh air was supplied and the remaining cylinders.

Figure 5:
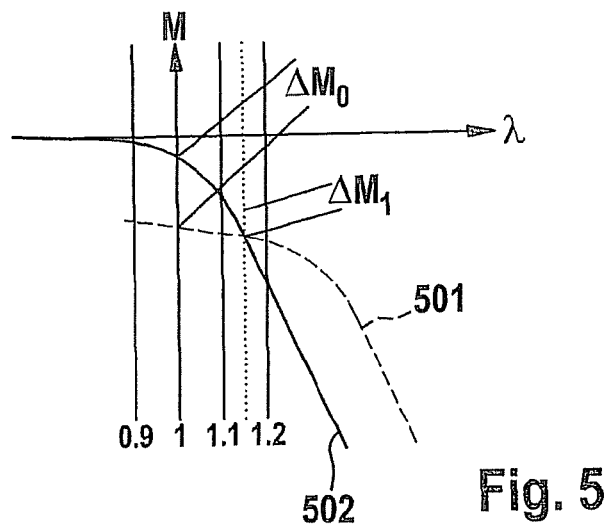
FIG. 5 shows a third diagram for a fifth and a sixth characteristics line.

FIG. 5 shows the curve of the torque contribution of the rich cylinder, that is, the cylinder which is unintentionally being supplied with too little fresh air, and it is designated by 501. The curve of the remaining cylinders (lean cylinder) is designated by 502 in FIG. 5. The curve of the torque contribution of lean cylinder 502 begins, for example, for lambda less than 0.9 at a positive value different from 0 and drops off thereafter, first linearly and then having an increased gradient, and drops off linearly again for lambda values greater than 1.1. The curve of the torque contributions of rich cylinder 501 begins, for lambda values less than 0.9, at a positive starting value that is different from 0 which, however, is less than the starting value of the curve of the torque contributions of lean cylinder 502. Subsequently, curve 501 first drops approximately linearly and then at an increasing gradient, and drops off linearly again for large lambda values. The curve of the torque contributions of the rich cylinder intersects the curve of the torque contributions of the lean cylinders at a lambda value of 1.15.

The difference between the torque contributions of the rich cylinder and of the lean cylinder for lambda=1 is designated in FIG. 5 by $\Delta M0$. The difference between the torque contributions of the rich cylinder and of the lean cylinder for lambda=1.15 is designated in FIG. 5 by $\Delta M1$.

Also in the case shown in FIG. 5, in which a cylinder is supplied with too little fresh air, a correction of the injection quantities in second operating mode B2 leads to the fact that the difference between the torque contributions of the rich cylinder and of the lean cylinders clearly increases after the correction in a range for lambda less than a second range boundary, for instance, less than 1.15.

The influence, pointed out, of the charge differences between the individual cylinders on the quality of the cylinder-torque equalization requires being able to recognize reliable whether an erroneous supplying of a cylinder with a fresh air quantity that is too large or too small has occurred, before adjustment parameters for correcting the fuel quantity in the cylinder-torque equalization function are ascertained. For this purpose, the internal combustion engine is first operated in first operating mode B1, and the running smoothness is ascertained. Subsequently, the internal combustion engine is operated in the second operating mode B2 and the running smoothness is ascertained again. The two ascertained smooth running values are then compared, and it is checked thereby whether a charging error has occurred. The adjustment parameters are only determined and stored if no inadmissible, large charging error has occurred. Subsequently, the adjustment parameters may be used in operation in the second operating mode for all lean lambda values or lambda being greater than, or equal to 1.

During one working cycle, for instance, of a four-stroke Otto engine, piston 120 moves, during an intake cycle, first at a crankshaft angle of 0°, downwards from a top dead center. At bottom dead center, that is, at a crankshaft angle of 180°, a compression stroke begins that follows the intake stroke. The compression stroke lasts from crankshaft angle 180° to crankshaft angle 360°. There then follows a power stroke that is assigned to the crankshaft angle range of 360° to 540°. After the power stroke, there follows an exhaust stroke, which is assigned to the crankshaft angle range of 540° to 720°. Sensor 123 ascertains the segment times, for example, which means the time period required to run through the crankshaft angle ranges (segments) assigned to the strokes of the working cycle. In this context, the present invention is not limited to this type of ascertainment of the segment times, but may also be used for any other type of ascertainment in an analogous manner.

The segment times thus ascertained are transmitted via a switchover device 107 of a first recording device 103 or a second recording device 104.

First recording device 103 and second recording device 104 ascertain an irregular running signal from the segment times. First recording device 103 ascertains a first variable L1, which characterizes the smooth running of the internal combustion engine in first operating mode B1.

The second recording device ascertains the second variable L2, which characterizes the smooth running of the internal combustion engine in the second operating mode B2. The first ascertained variable L1 and the second ascertained variable L2 are ascertained in a known manner in this instance, by a comparison of the segment times of the individual cylinders situated in internal combustion engine 100. In addition, the segment time is assigned to each cylinder during which the respective cylinder is in the power stroke. Thus, in the example of the four-stroke Otto engine, for example, the segment time for first cylinder 102 is observed in a crankshaft angle range of 360° to 540°. The observation of the segment time does not necessarily have to include the entire range of 360° to 540° of crankshaft angle, in this context, but may also include a smaller crankshaft angle range between 360° und 540°. The observed crankshaft angle range may likewise begin already before reaching crankshaft angle 360°, or end only after passing crankshaft angle 540°. It is important, in this connection, that a crankshaft angle range is observed in which first cylinder 102 supplies its torque contribution D to crankshaft 122. The present invention is not limited to this way of ascertaining smooth running. Smooth running variables ascertained in other ways may also be used in an analogous manner.

First variable L1 is calculated, in this instance, when switchover device 107 passes on the segment times from sensor 123 to first recording device 103. In this case, switchover device 107 passes on the segment times only to first recording device 103 and not to second recording device 104.

Second variable L2 is calculated when switchover device 107 passes on the segment times from sensor 123 to second recording device 104. In this case, the segment times are passed on by switchover device 107 only to second recording device 104 and not to first recording device 103.

Switchover device 107 switches over, in this context, as a function of the operating mode, of internal combustion engine 100, that is specified by a specification device 108. Specification device 108, for example, gives out first operating mode B1 or second operating mode B2 to switchover device 107 and to a control device 109.

Control device 109 reads in the specified operating mode B1 from specification device 108. In addition, control device 109 receives a lambda signal that reproduces the oxygen proportion in the exhaust gas of the internal combustion engine. The lambda signal, in this instance, is ascertained by a third recording device 113, which records a signal from lambda sensor 111, a current signal, for instance, and evaluates it in a known manner. In addition, control device 109 receives a current throttle valve angle $\alpha_I$ from throttle valve 112 as an actual value. In addition, control device 109 receives rotational speed n of internal combustion engine 100. Rotational speed n of internal combustion engine 100 is ascertained, for instance, by a recording device, not shown in FIG. 1, from the signal of sensor 123, in a known manner. Control device 109 also records air mass F that is supplied to the cylinders, which is measured by air mass sensor 124.

Control device 109 ascertains a setpoint value for throttle valve angle $\alpha_s$, and sends it to throttle valve 112. In addition, control device 109 ascertains control signals for intake valve 115, exhaust valve 118, fuel injector 116 and spark plug 117. These control variables are ascertained in a known manner, for instance, from one of rotational speed n, the actual value of throttle valve angle $\alpha_I$ and the supplied fresh air quantity F. The selection of the respective setpoint value depends in this case, for instance, on the operating mode specified by specification device 108. In addition, using a lambda regulation provided in control device 109, a common lambda setpoint value, that depends on the specified operating mode, is regulated for all cylinders. For this purpose, the control variables for throttle valve 112, intake valve 115, exhaust valve 118, fuel injector 116 and spark plug 117, for example, are regulated as a function of a desired torque of internal combustion engine 100, of the difference of the lambda value in the exhaust gas and the common lambda setpoint value. The desired torque is specified in a known manner, using an accelerator pedal.

Control unit 110 also includes a comparator device 105 which compares first variable L1 to second variable L2. For this purpose, first variable L1 and second variable L2 are stored, for instance, in a memory in control unit 110, and compared only when a value, that is valid, is present for first variable L1 and second variable L2. Comparator unit 105 forms the amount of the difference of first. variable L1 and second variable L2, for example. Thereafter, this difference is compared to a specified value W. If the absolute amount of the difference of first variable L1 and second variable L2 is greater than specified value W, a status of "erroneously supplied fresh air quantity" is transmitted to a calculating unit 106. Otherwise a status of "no error" is transmitted to calculating device 106.

Calculating device 106 reads the result of the comparison from comparator device 105 and the lambda value from third recording device 113. Calculating device 106 checks whether lambda is in a range for carrying out the diagnosis "valid range", such as lambda=1 ±5%. As soon as the status "erroneously supplied fresh air quantity" is transmitted by comparator device 105 to calculating device 106, calculating device 106 stores this information in a memory provided in control unit 110.

In case the status "no error" is transmitted by comparator device 105 to calculating device 106, calculating device 106 ascertains at least one adjustment value A. For this purpose, calculating device 106 checks whether second variable L2 is less than a specified threshold S. Specified threshold S is a function, for example, of the average value of the segment times of all the cylinders built into internal combustion engine 100 in their power stroke. Specified threshold S is selected to be 2% greater than the average value of the segment times, for example. If second variable L2, that is, the segment time of the first cylinder, is greater or equal to specified threshold S, the at least one adjustment value A is ascertained.

If second variable L2 is less than specified threshold S, currently ascertained adjustment value A is stored as a correction value, for instance, in the memory in control unit 110.

In control device 109, it is provided, for this purpose, that the adjustment value A be taken into account in the control of fuel injector 116. To do this, a main injection quantity is ascertained as a function of the adjustment value, in a known manner. In the control of fuel injector 116, the main injection quantity is then first injected, and the secondary injection is injected only at a later point in time. In this context, the point in time of the main injection corresponds to the point in time of the injection of the fuel quantity in the uncorrected operating case. The point in time of the injection of the secondary injection is selected to be so late that no torque contribution is generated by the combustion of the secondary injection.

Figure 2:
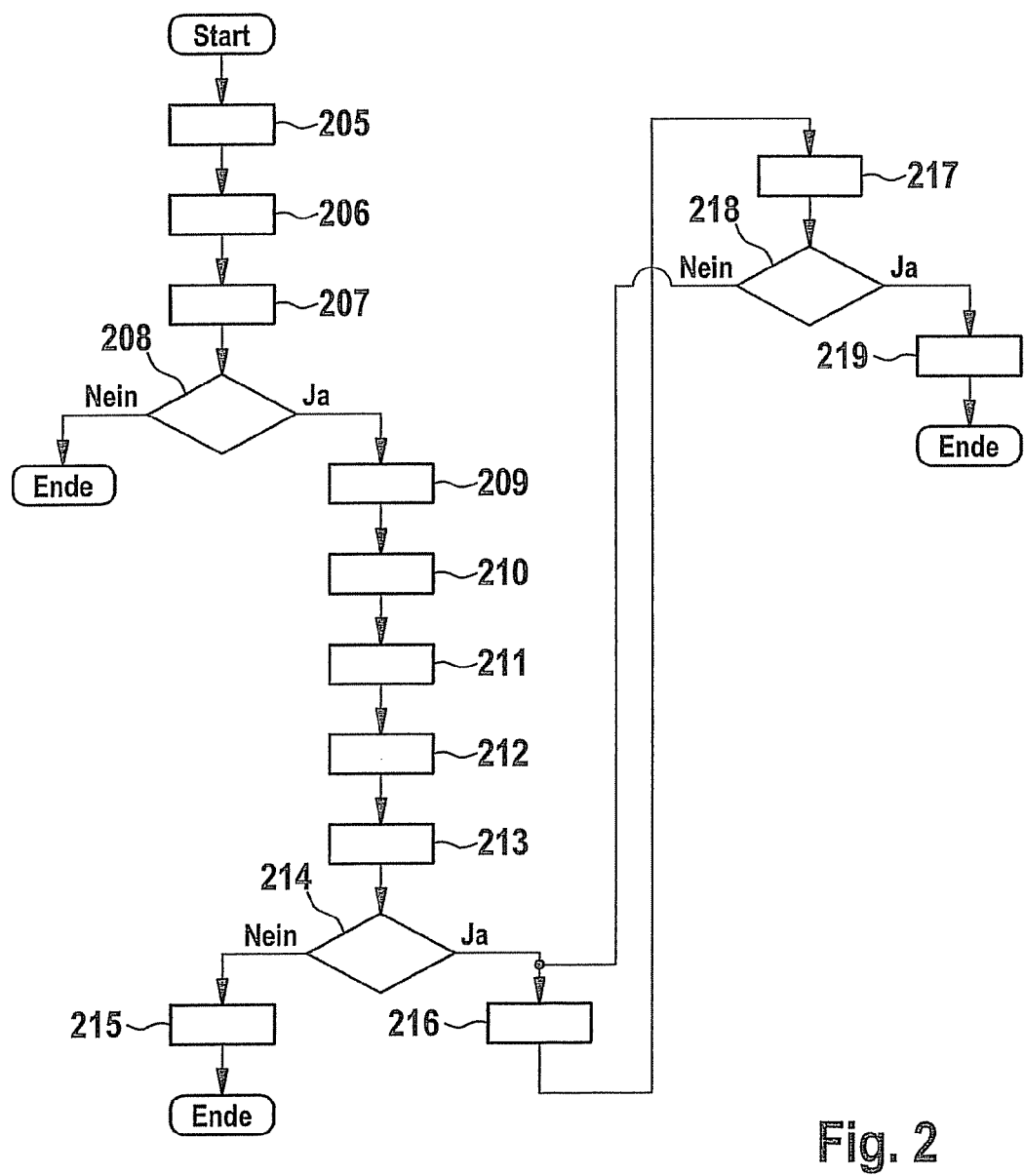
FIG. 2 shows a flow chart of the method according to the present invention.

FIG. 2 shows a flow chart of a specific embodiment of the method according to the present invention. The method is started, for example, as soon as irregular running is detected, that is, when the segment time of at least one of the cylinders of internal combustion engine 100 deviates too greatly from the average value of the segment times of all the cylinders. The method then continues at step 205.

At step 205, first operating mode B1 is specified. The method then continues at step 206.

The lambda value is recorded at step 206. Subsequently, step 207 is executed.

At step 207, internal combustion engine 100 is then activated using the setpoint values for the first operating mode B1. The method then continues at step 208.

At step 208, it is checked whether the actual value of lambda is in the valid range, such as in the range of lambda=1 ±5%. If the response is "yes", the program branches to a step 209. If the response is "no", the method is ended.

At step 209, first variable L1 is ascertained. Subsequently, a step 210 is executed, at step 210 second operating mode B2 is specified. Subsequently, a step 211 is executed.

At step 212, the internal combustion engine is activated using the setpoint values for second operating mode B2. Subsequently, a step 212 is executed.

At step 212, second variable L2 is ascertained. Subsequently, a step 213 is executed.

At step 213 the difference between first variable L1 and second variable L2 is ascertained, for instance, as the absolute amount of the difference of L1 and second variable L2. Subsequently, a step 214 is executed.

At step 214, it is checked whether the difference between first variable L1 and second variable L2 exceeds a specified value W, and it is also checked, for example, whether the absolute amount of the difference of first variable L1 and second variable L2 is greater than the specified value W. The specified value W is selected, for instance, at 5% of first variable L1, and if the difference between first variable L1 and second variable L2 is greater than specified value W, a step 215 is executed. Otherwise a step 216 is executed.

At step 215, the status "erroneously supplied fresh air quantity" is stored in the memory in control unit 110. Alternatively supplementing this, the information "erroneously supplied fresh air quantity" may also be output to the driver of the motor vehicle, or to other functions which are used, for example, in the engine control of the motor vehicle. Then the method is terminated.

At step 216, the main injection quantity is ascertained as a function of the current lambda as well as of rotational speed n of internal combustion engine 100, using a controller, in such a way that torque contribution D, which is generated by the combustion of the main injection quantity in combustion chamber 101 of first cylinder 102, corresponds to torque contribution D of the remaining cylinders. Subsequently, adjustment value A is ascertained. The method then continues at step 217.

At step 217, second variable L2 is recorded. Subsequently, a step 218 is executed.

At step 218 it is checked whether second variable L2 is less than specified variable S, and if "yes", the method branches to a step 219, and if "no", the system branches to step 216.

At step 219, adjustment value A is stored, for instance, in the memory in control unit 219. Then the method is terminated.

What is claimed is:

1. A method for diagnosing an internal combustion engine, in which a cylinder includes a combustion chamber, a fuel quantity and a fresh air quantity being supplied to the combustion chamber for the combustion to generate a torque contribution of the cylinder, which torque contribution is, in a first operating mode of the internal combustion engine, essentially a function of the fresh air quantity supplied, and, in a second operating mode of the internal combustion engine, essentially a function of the fuel quantity supplied, the method comprising:
   ascertaining a first variable characterizing a smooth running of the internal combustion engine in the first operating mode;
   ascertaining a second variable characterizing the smooth running of the internal combustion engine in the second operating mode
   comparing the first variable to the second variable
   diagnosing the internal combustion engine as a function of the result of the comparison; and
   recognizing an erroneously supplied fresh air quantity if a third variable, that is a function of the absolute amount of the difference between the first variable and the second variable, is greater than a specified value.

2. The method as recited in claim 1, wherein the first variable and the second variable are ascertained at least partially during a power stroke of the cylinder.

3. The method as recited in claim 2, wherein, in the first operating mode, a first fuel quantity is injected; and, in the second operating mode, a second fuel quantity and a third fuel quantity are injected.

4. The method as recited in claim 2, wherein the second fuel quantity is determined in the second operating mode so that a lean mixture is created.

5. The method as recited in claim 2, wherein a correction of the supplied fuel quantity takes place if the third variable, that is a function of the absolute amount of the difference between the first variable and the second variable, is less than or equal to a specified threshold.

6. The method as recited in claim 5, wherein a value for the correction is ascertained in the second operating mode.

7. The method as recited in claim 1, wherein, in the first operating mode, a first fuel quantity is injected; and, in the second operating mode, a second fuel quantity and a third fuel quantity are injected.

8. The method as recited in claim 7, wherein the second fuel quantity is determined in the second operating mode so that a lean mixture is created.

9. The method as recited in claim 7, wherein the third fuel quantity is determined so that the lambda value of the exhaust gas is essentially one.

10. The method as recited in claim 7, wherein a correction of the supplied fuel quantity takes place if the third variable, that is a function of the absolute amount of the difference between the first variable and the second variable, is less than or equal to a specified threshold.

11. The method as recited in claim 10, wherein value for the correction is ascertained in the second operating mode.

12. The method as recited in claim 1, wherein the second fuel quantity is determined in the second operating mode so that a lean mixture is created.

13. The method as recited in claim 12, wherein a correction of the supplied fuel quantity takes place if the third variable, that is a function of the absolute amount of the difference between the first variable and the second variable, is less than or equal to a specified threshold.

14. The method as recited in claim 13, wherein the ascertainment of a correction value of the fuel quantity supplied takes place in the second operating mode.

15. The method as recited in claim 1, wherein a correction of the supplied fuel quantity takes place if the third variable, that is a function of the absolute amount of the difference between the first variable and the second variable, is less than or equal to a specified threshold.

16. The method as recited in claim 15, wherein a value for the correction is ascertained in the second operating mode.

17. An apparatus for diagnosing an internal combustion engine, in which a cylinder includes a combustion chamber, a fuel quantity and a fresh air quantity being supplied to the combustion chamber for combustion to generate a torque contribution of the cylinder, which torque contribution is, in a first operating mode of the internal combustion engine, essentially a function of the fresh air quantity supplied, and, in a second operating mode of the internal combustion engine, essentially a function of the fuel quantity supplied, the apparatus comprising:

a first ascertainment device which is configured to ascertain a first variable characterizing the smooth running of the internal combustion engine in the first operating mode;

a second ascertainment device which is configured to ascertain a second variable characterizing the smooth running of the internal combustion engine in the second operating mode;

a comparator device which is configured to compare the first variable to the second variable; and a calculating device which is configured to diagnose the internal combustion engine as a function of the result of the comparison, wherein an erroneously supplied fresh air quantity is recognized if a third variable, that is a function of the absolute amount of the difference between the first variable and the second variable, is greater than a specified value.

18. A non-transitory computer-readable data storage medium on which are stored instructions that are executable on a computer, and which, when executed on the computer, performs a method for diagnosing an internal combustion engine, in which a cylinder includes a combustion chamber, a fuel quantity and a fresh air quantity being supplied to the combustion chamber for the combustion to generate a torque contribution of the cylinder, which torque contribution is, in a first operating mode of the internal combustion engine, essentially a function of the fresh air quantity supplied, and, in a second operating mode of the internal combustion engine essentially a function of the fuel quantity supplied, the method comprising:

ascertaining a first variable characterizing a smooth running of the internal combustion engine in the first operating mode ascertaining a second variable, characterizing the smooth running of the internal combustion engine in the second operating mode;

comparing the first variable to the second variable;

diagnosing of the internal combustion engine as a function of the result of the comparison; and recognizing an erroneously supplied fresh air quantity if a third variable, that is a function of the absolute amount of the difference between the first variable and the second variable, is greater than a specified value.

\* \* \* \* \*

UNITED STATES PATENT AND TRADEMARK OFFICE
CERTIFICATE OF CORRECTION

PATENT NO.       : 8,505,367 B2
APPLICATION NO.  : 13/141627
DATED            : August 13, 2013
INVENTOR(S)      : Porten et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 113 days.

Signed and Sealed this
Fifteenth Day of September, 2015

Michelle K. Lee
*Director of the United States Patent and Trademark Office*